United States Patent [19]
Leiber et al.

[11] Patent Number: 5,092,419
[45] Date of Patent: Mar. 3, 1992

[54] ALL-WHEEL STEERING

[75] Inventors: Heinz Leiber, Oberriexingen; Wolfgang Peter, Kirchheim/Teck; Erich Waxenberger, Neuhausen; Werner Schneider, Winnenden, all of Fed. Rep. of Germany

[73] Assignee: Daimler-Benz Aktiengesellschaft, Fed. Rep. of Germany

[21] Appl. No.: 414,244

[22] Filed: Sep. 29, 1989

[30] Foreign Application Priority Data

Oct. 1, 1988 [DE] Fed. Rep. of Germany ....... 3833420

[51] Int. Cl.⁵ .......................................... B62D 5/12
[52] U.S. Cl. ..................... 180/140; 180/143; 280/91
[58] Field of Search .............. 180/140, 141, 143, 152, 180/158; 280/91

[56] References Cited

U.S. PATENT DOCUMENTS

| | | | |
|---|---|---|---|
| 2,761,693 | 9/1956 | Stover | 180/140 |
| 3,516,260 | 6/1970 | Wood | 180/140 |
| 3,556,243 | 1/1971 | Susag | 180/140 |
| 4,591,177 | 5/1986 | Perlini | 180/140 |
| 4,926,954 | 5/1990 | Ataka et al. | 180/140 |

FOREIGN PATENT DOCUMENTS

| | | | |
|---|---|---|---|
| 0146759 | 8/1985 | Japan | 180/140 |
| 8904269 | 5/1989 | World Int. Prop. O. | 180/140 |

Primary Examiner—Charles A. Marmor
Assistant Examiner—Anne Marie Boehler
Attorney, Agent, or Firm—Evenson, Wands, Edwards, Lenahan & McKeown

[57] ABSTRACT

An all-wheel steering control or regulating device for vehicle rear wheel steering, which is motor-driven and permits any desired predeterminable steering angles of the rear wheels as a function of the steering angles of the front wheels or other parameters. In the event of error detection in the system, a drive motor of the rear wheel steering is switched to an inoperative condition and a hydraulic positive coupling between front wheel steering and rear wheel steering is simultaneously established by means of separate piston-cylinder units, with the result that the rear wheels are steered simultaneously with the front wheels.

16 Claims, 1 Drawing Sheet

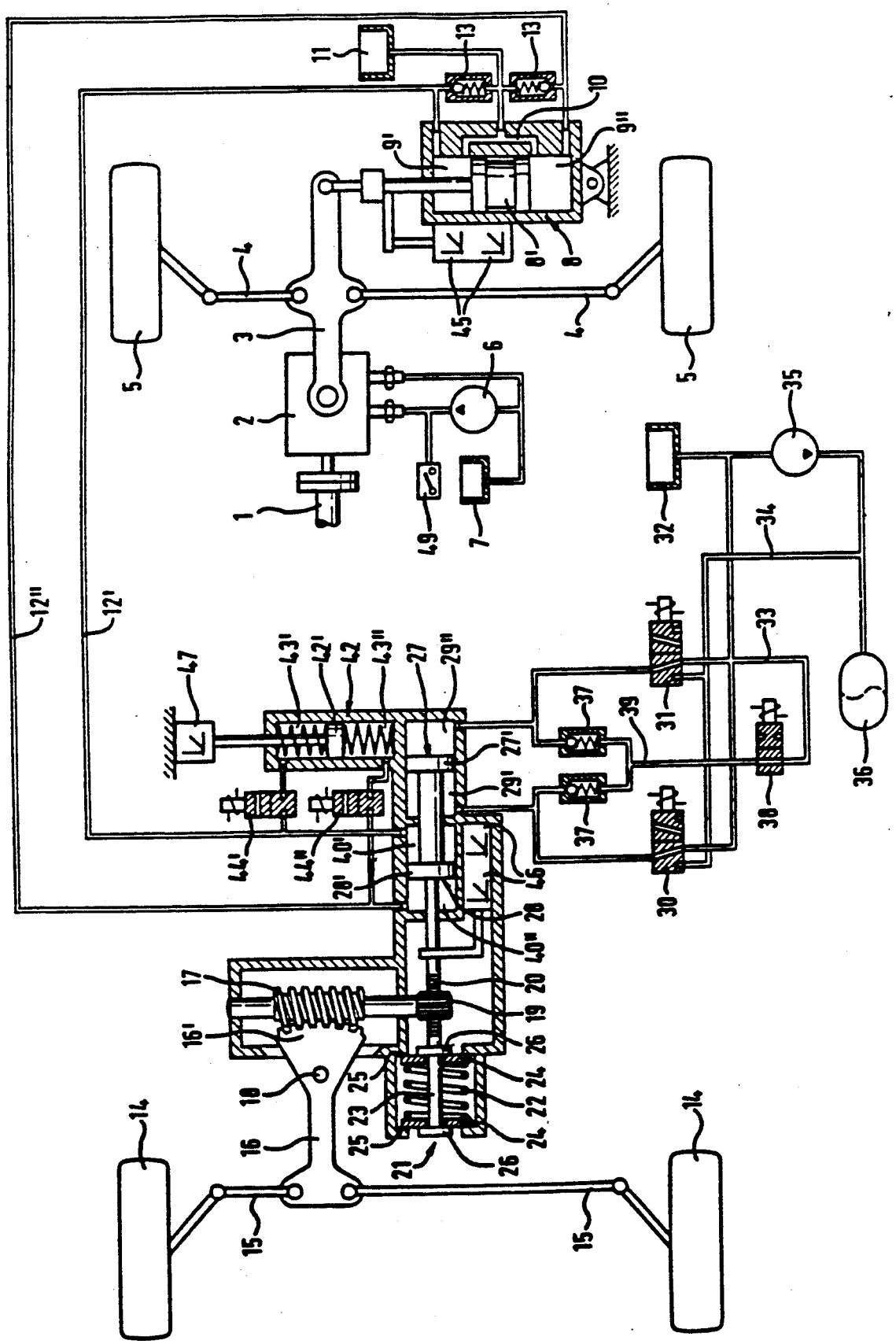

ALL-WHEEL STEERING

BACKGROUND AND SUMMARY OF THE INVENTION

The invention relates to an all-wheel steering for motor vehicles having manual front actuated wheel steering (preferably servo-assisted) and motor-driveable rear wheel steering which is actuated by means of a control (regulating device) as a function of the steering angle of the front wheels and/or other parameters through a comparison of set values and actual values of the rear-wheel steering angle.

Vehicles having all-wheel steering are known in principle.

All-wheel steering should make possible a deflection of the rear wheels in an opposite direction to the front wheels in order to increase the turning ability of the vehicle. Also, there should be the possibility of steering the rear wheels in the same direction as the front wheels but with smaller steering angles, in order to improve—at least subjectively—the directional stability of the vehicle at higher speeds and, in particular, during sudden steering motions used during crash avoidance maneuvers. By virtue of the deflection in the same direction, a larger slip angle, such as is necessary during cornering, is also obtained at the rear wheels at the very beginning of cornering.

In this context, controlling the rear wheels as a function of speed is known where at very low travelling speeds, the rear wheels are controlled in the opposite direction to the front wheels, while at higher travelling speeds, control in the same direction is effected.

It is possible in principle to additionally steer the rear wheels as a function of other vehicle parameters in order, for example, to automatically mitigate crosswind effects or swerving movements of the vehicle.

In such highly developed all-wheel steering systems, a sophisticated computer-controlled control or regulating device is normally used for the control of the rear wheels. In the case of a malfunction of this sophisticated device, it must be possible to make a switch to a computer-independent emergency control.

In this connection, provision has already been made to return the rear wheels automatically to their neutral central position as soon as a malfunction of the computer is detected.

However, this is disadvantageous, since certain extremely critical driving situations can arise if returning of the rear wheels takes place during driving situations within the threshold region of the controllability of the vehicle, for example during rapid cornering. In addition, there is the fact that the driver may be dangerously surprised by a sudden return of the previously deflected rear wheels to their central position.

It is therefore the object of the invention to create an all-wheel steering system which, in a simple manner in terms of construction, guarantees a high degree of driving safety even in the case of a failure or a malfunction of the sophisticated computer-controlled control or regulating device.

This object is achieved according to the invention by having the front wheel steering positively connected to a first double-acting piston-cylinder unit, the piston of which in its central straight-ahead position of the front wheel steering, opens a bypass connecting the two chambers of the first piston-cylinder unit. Rear wheel steering is provided with a self-locking-free motor drive, prestressed by a spring arrangement into its straight-ahead position of rear wheel steering. This motor drive is positively coupled to a second double-acting piston-cylinder unit, the swept chambers of which have the same size ratio as the swept chambers of the first piston-cylinder unit. The two piston-cylinder units are hydraulically coupled to one another via two lines which—in the case where each of the units has swept chambers of unequal size—one is arranged to connect the larger swept chambers with one another and the other to connect the smaller swept chambers together. A third piston-cylinder unit is arranged between these lines with its swept chambers having the same size ratio as the swept chambers of the aforementioned piston cylinder units. The larger swept chamber of the third piston-cylinder unit is connectable via shut-off valve to the line connecting the larger swept chambers of the two other piston-cylinder units and the other, or smaller swept chamber of the third piston cylinder unit is connectable via a further shut-off valve to the line connecting the smaller swept chambers of the two other piston-cylinder units. When these shut-off valves are closed, front wheel steering and rear wheel steering are hydraulically positively connected to produce a deflection in the same direction of front and rear wheels.

The all-wheel steering according to the invention makes it possible when the shut-off valves are open and the control or regulating device is functioning, to control the rear wheels according to any desired steering laws by means of the motor drive.

As soon as an error in the control or regulating device is detected, the said shut-off valves drop into their closing position and a hydraulic positive coupling between front wheel steering and rear wheel steering is thereby obtained. It is particularly advantageous that the steering angle of the rear wheels, which has been set prior to this, remains unchanged upon the closure of the shut-off valves when the vehicle is travelling through a curve and the front wheels are correspondingly locked. Upon alteration of the steering angle of the front wheels, the rear wheels are steered concomitantly in the same direction. The rear wheels are set automatically to their straight-ahead position by the spring arrangement as soon as the front wheels are set to their straight-ahead position, since here, the positive coupling between front wheel steering and rear wheel steering is cancelled because the piston of the first piston-cylinder unit associated with the front wheel steering opens the bypass connecting the swept chambers of this unit.

A further particular advantage of the invention consists in the fact that leakproofness and hence the ability of the hydraulic system (formed by the piston-cylinder units and the associated lines) to function, can be constantly checked during the error-free operation of the control or regulating device. Namely, during this operating phase, in which the shut-off valves which connect the chambers of the third piston-cylinder unit to the lines between the other piston-cylinder units, are open. The piston of the third piston-cylinder unit executes stroke movements which are determined by the steering movements both of the front wheel and of the rear wheel steering, provided that the hydraulic system is operating in error-free fashion.

Thus, according to a preferred embodiment of the invention, if the piston of the third piston-cylinder unit is positively coupled to a stroke sensor connected to the input side of the control or regulating device, or of the computer of the latter, then it is possible to check by means of the computer, as to whether the piston stroke is commensurate with the respective front and rear steering angles, which are detectable by means of further stroke sensors at the piston of the other piston-cylinder units and are fed to the input side of the computer.

Other objects, advantages and novel features of the present invention will become apparent from the following detailed description of the invention when considered in conjunction with the accompanying drawings.

BRIEF DESCRIPTION OF THE DRAWING

The single FIGURE shows a schematized overall representation of a preferred embodiment of the all-wheel steering.

DETAILED DESCRIPTION OF THE DRAWING

The front wheel steering of the vehicle is actuated manually by means of a steering handwheel (not illustrated) through steering column 1. The steering column 1 forms the input of a front-axle steering gear 2, the output of which is formed by a pivoted lever 3 which is coupled to the front steering wheels 5 of the vehicle via the steering rods 4. The front-axle steering gear 2 has a conventional power assisting steering servo unit, of which only a pump 6 and a hydraulic reservoir 7 are illustrated in the drawing. As is conventional in power steering units, the steering handwheel can be actuated with little force to produce large adjusting forces or adjusting torques at the pivoted lever 3.

The free end of the pivoted lever 3 is drivingly connected to a first double-acting piston-cylinder unit 8, which it displaces from one end position to another end position when the front wheel steering is displaced from its one extreme position (for example the right-hand extreme position) into the other extreme position (for example the left-hand extreme position). In the illustrated central position of the piston 8', associated with the straight-ahead position of the front wheels 5, the flow-through swept chambers 9'40 and 9" are connected via a bypass line 10, which upon displacement of the piston 8' is blocked in one direction or the other since the piston 8' covers one orifice of the bypass line 10 in each case. The bypass line 10 is also connected to a hydraulic reservoir 11.

The swept chambers 9' and 9" of the piston-cylinder unit 8 are also hydraulically connected (via lines 12' and 12") to a second piston-cylinder unit 28 associated with the rear wheel steering. The lines 12' and 12" are protected against excess pressure by pressure relief valves 13 which connect the lines 12' and 12" to the hydraulic reservoir 11 above a pressure threshold.

The steerable rear wheels 14 are connected by means of their steering rods 15 to a double-armed pivoted lever 16 whose end, facing away from the steering rods 15, is designed as a toothed segment 16'. The toothed segment 16' interacts with a worm 17, so that the pivoting lever 16 pivots about its bearing pivot 18 in the clockwise direction or the counterclockwise direction when the worm 17 rotates in one direction or the other.

A pinion 19 on the shaft of the worm 17 meshes with a rack 20, resiliently urged by means of a restoring arrangement 21 into a central position at which the rear wheels 14 assume their straight-ahead position.

For this purpose, the restoring arrangement 21 has a helical compression spring 22 which urges two annular discs 24, displaceable on a rod 23 which is provided with the rack 20, against stops 25 fixed with respect to the vehicle. Stop discs 26 are fixed on the rod 23 and interact with the annular discs 24, spaced apart by an amount which corresponds to the distance between the stops 25. In the illustrated central position of the rod 23 and of the rack 20, the annular discs 24 thus rest against both the stops 25 and against the stop discs 26. If the rod 23 or rack 20 is displaced to the right or to the left, the helical compression spring 22 is compressed to a greater or lesser extent, with the result that a restoring moment is produced. If the rod 23 or rack 20 is displaced to the left, the left-hand stop disc 26 lifts off from the left-hand annular disc 24, which remains pressed up against its stop 25. The right-hand stop disc 26 simultaneously lifts the right-hand annular disc 24 off of its stop 25 and moves it in the direction of the other annular disc 24. Displacement to the right acts in corresponding manner.

The rack 20 is furthermore connected to two double-acting piston-cylinder units 27 and 28, which are accommodated coaxially to one another in a common housing.

The swept chambers 29' and 29" of the piston-cylinder unit 27 can be connected via change-over valves 30 and 31 either to a line 33 leading to a hydraulic reservoir 32 or to a line 34 connected to the delivery side of a hydraulic pump 35 and pressure accumulator 36.

Otherwise, the swept chambers 29' and 29" are connected via non-return valves 37, shut-off valve 38 and relief line 39 to the reservoir 32 irrespective of the position of the change-over valves 30 and 31. The shut-off valve 38 is resiliently stressed into its open position connecting the swept chambers 29' and 29" to the relief line 39. The shut-off valve 36 which thus constitutes a self-locking-free motor drive system only assumes a closing position if its electric positioning motor is supplied with current. Thus, the piston-cylinder unit 27 in combination with change-over valves 30 and 31, and shut-off valve 38 constitutes a self-locking-free motor drive, in that the drive is prevented from self-locking in the case of detecting error in the control or regulating device.

The swept chambers 40' and 40" of the piston-cylinder unit 28 are connected via lines 12' and 12" to the swept chambers 9' and 9" of the piston-cylinder unit 8 of the front wheels. In this arrangement, the line 12' connects the smaller effective surfaces of the pistons 8' and 28', respectively swept chambers 9' and 40', while the line 12" connects the swept chambers 9" and 40" which open to the larger effective surfaces of the pistons 8' and 28'. The piston-cylinder units 8 and 28 are designed in such a way that the ratio between the larger and the smaller piston effective surfaces is the same in both cases. Accordingly, the cross-sections of the rod connecting the piston 28' to the rack 20 and of the rod between the pistons 28' and 27' are of different dimensions.

A further third piston-cylinder unit 42 has a piston 42' which is stressed into a central position by means of springs. Its swept chambers 43' and 43" are connected to lines 12' and 12", extending between piston-cylinder units 8 and 28, via shut-off valves 44' and 44". In this arrangement, the chamber 43' (having the smaller piston effective surface) is connected via the shut-off valve 44' to the line 12' and line 12" is connected via the shut-off valve 44" to the swept chamber 43" (which has the larger piston effective surface). The size ratio between the effective surfaces of the piston 42' likewise corresponds to the size ratio of the effective surfaces of the pistons 28' and 8' respectively.

The all-wheel steering illustrated operates in the following manner:

A control or regulating device (not illustrated) is connected to receive an input from displacement sensors 45-47 (from piston-cylinder units 8, 27, 28 and 42, respectively) which, for reasons of redundancy, can be in partially duplicated arrangement. The signals from the dual displacement sensors 45 reproduce the stroke position of the piston 8' of the piston-cylinder unit 8 and accordingly simultaneously represent a signal for the particular steering position of the front wheels 5. The dual displacement sensors 46 record the displacement of the rack 20 and the pistons 27' and 28', the displacements of the piston-cylinder units 27 and 28 connected thereto. These signals simultaneously reproduce the steering position of the rear wheels 14. The signals of the displacement sensor 47 indicate the displacement of the piston 42' of the piston-cylinder unit 42.

In the case of error-free functioning, the positioning motors of the shut-off valves 38, 44' and 44" are excited by the control or regulating device (not shown) in such a way that the shut-off valve 38 is closed and the shut-off valves 44' and 44" are open. By reason of the open shut-off valves 44' and 44", hydraulic positive coupling does not exist between the piston-cylinder units 8 and 28, i.e. the pistons 8' and 28' can move independently relative to one another via the action of piston-cylinder unit 42. In this arrangement, a displacement of the piston 42' of the piston-cylinder unit 42 may occur if the pistons 8' and 28' are moved unequally or in opposite directions to one another.

The control or regulating device can actuate the change-over valves 30 and 31 in order to displace the piston 27 of the piston-cylinder unit 27 to deflect the rear wheels 14 in one direction or the other as a function of the particular steering angle of the front wheels 5 and/or a function of further parameters, for example vehicle travelling speed. At higher speeds, a deflection of the rear wheels 14 in the same direction as the front wheels 5 is generally provided, but with reduced steering angles in order to increase the directional stability of the vehicle during avoidance maneuvers. At very low travelling speeds, the change-over valves 30 and 31 are actuated in such a way that the rear wheels 14 are deflected in the opposite direction to the front wheels 5 in order to improve the turning ability of the vehicle with regard to maneuvers.

In principle, any desired interrelationships between the steering angles of the front wheels and of: the travelling speed, further parameters, and/or steering angles of the rear wheels are possible and implementable. For this purpose, the control or regulating device merely has to be appropriately programmed.

The control or regulating device constantly checks that it is operating in error-free fashion. In the case of an error detection, the self-locking-free positioning motors (in general the electric motors of shut-off valves 38 and 44' and 44") are immediately switched off, with the result that the shut-off valves 44' and 44" are adjusted by their spring force to the closing positions illustrated and the shut-off valve 38 is adjusted to the open position illustrated. By reason of the opened shut-off valve 38, the piston-cylinder unit 27 is inoperative, irrespective of the position of the change-over valves 30 and 31, because its two swept chambers are constantly connected to the hydraulic reservoir 32 via the relief line 39.

By virtue of the now closed shut-off valves 44' and 44", the piston-cylinder units 8 and 28 are positively coupled to one another via the lines 12' and 12". As soon as the piston 8' is pushed somewhat out of its central position and blocks the bypass line 10, the piston 28' of the piston-cylinder unit 28 is, upon further displacement of the piston 8', displaced with corresponding actuation of the steering of the rear wheels 14. If the control or regulating device detects an error during cornering, a positive coupling thus immediately arises between the piston-cylinder units 8 and 28. By virtue of the piston 8 being displaced from its central position during cornering, i.e. while the steering position of the front wheels 5 remains unchanged, the steering position of the rear wheels 14 cannot change either. Only when the front wheel steering is actuated is the rear wheel steering correspondingly actuated also. As soon as the front wheel steering has reached its central position, in which the bypass 10 is freed by the piston 8' of the piston-cylinder unit 8, the hydraulic positive coupling between the piston-cylinder units 8 and 28 is cancelled, with the result that from then on, if the rear wheels 14 are not yet in their straight-ahead position, the restoring device 21 carries out a corresponding restoration of the rear wheels 14 to their straight-ahead position with the piston 28' of the piston-cylinder unit 28 also being brought into its central position.

If the front wheels 5 are subsequently locked to the right or to the left from their straight-ahead position, a deflection in the same direction of the rear wheels 14 from their straight-ahead position also occurs. In the unlikely event of the servo unit of the front wheel steering additionally failing (e.g. if the pump 6 does not generate any pressure) the control or regulating device can detect this by means of a pressure sensor 49 and will then open the shut-off valves 44' and 44". Since the shut-off valve 38 remains open, the rear wheel steering is then held or brought permanently into its straight-ahead position by the restoring device 21. An inordinate increase in the forces to be exerted by the driver during the actuation of the steering handwheel (e.g. as a result of the failure of the servo unit) is thus avoided. Since from now on, only the front wheel steering is actuated by means of the steering handwheel, the steering forces required remain within acceptable limits.

During error-free operation of the all-wheel steering and, in particular during error-free operation of the control or regulating device, the piston-cylinder units 8 and 28 and the hydraulic system components connected thereto are not required per se. Nevertheless, the possibility of being able to check this hydraulic system for functional reliability and, in particular, leakproofness is desired. This is accomplished by the displacement sensor 47 connected to the piston 42' of the piston-servo unit 42. During driving conditions in which the rear wheel steering is actuated in the opposite direction to the front wheel steering by means of the piston-cylinder unit 27, or remains unactuated in spite of the front wheel steering being actuated (for example at average travelling speeds), relatively marked displacements of the piston 42' occur. For example, when hydraulic medium displaced from the swept chamber 9" of the piston-cylinder unit 8 cannot be taken up by the swept chamber 40" of the piston-cylinder unit 28 under these driving conditions, this medium must be taken up with the medium displaced from the swept chamber 40" in the swept chamber 43" of the piston-cylinder unit 42.

In the above explanations, it has been assumed that the size ratio between the piston areas of the piston 42' of the piston-cylinder unit 42 are the same as the size ratio of the piston areas of the pistons 8' and 28' of the piston-cylinder units 8 and 28 respectively. If this is the case, the hydraulic medium pushed, for example, into the swept chamber 43" of the piston-cylinder unit 42 upon displacement of the pistons 28' and 8' displaces the piston 42' exactly far enough to enable the hydraulic medium displaced from the swept chamber 43' to be completely taken up by the swept chambers 40' and 9' of the piston-cylinder units 28 and 8 respectively.

In the case of other size ratios of the effective surfaces of the pistons, it may occur that some of the hydraulic medium displaced on one side of the piston-cylinder unit is forced via line 12', swept chamber 9' and bypass line 10 into the reservoir 11 or that hydraulic medium is withdrawn from the reservoir 11 via the lines. A corresponding operation applies for any medium displaced from the swept chamber 43" when the piston 42' is moved in the other direction.

The system described above can be modified if required.

If, for example, the size ratio of the effective surfaces of the pistons 8', 28' and 42' is the same, the bypass line 10 can be omitted. Instead, the swept chambers 9' and 9" of the piston-cylinder unit 8 or the lines 12' and 12" can in each case be connected to pressure accumulators via non-return valves which open towards the said swept chambers or lines. In order for this embodiment to allow for error detection (in the control or regulating device) for the restoring device 21 to bring the rear wheel steering into a straight-ahead position as soon as the front wheels are in the straight-ahead position, provision is expediently made to couple the shut-off valves 44' and 44" to steering gear elements of the front wheel steering such that these valves 44' and 44" are held open when the front wheels 5 are in the straight-ahead position. In the straight-ahead position of the front wheels, the piston-cylinder unit 42 thus forms a bypass which cancels the positive coupling of the piston-cylinder units 8 and 28 and is controlled by the front wheel steering.

Deviating from the embodiment illustrated in the drawing, the piston-cylinder units 27 and 28 can also be arranged approximately parallel to the steering rods. This arrangement is particularly expedient if it is desirable to connect the rod 23 directly or without self-locking gear elements to the steering rods 15. For this purpose, the rod 23 (situated approximately parallel to the steering rods 15) can be articulated on one arm of the pivoted lever 16, with the result that, upon displacement of the rod 23, said lever executes a swivelling stroke and deflects the wheels 14 correspondingly.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. All-wheel steering for motor vehicles having front wheel steering actuated by a steering handwheel and motor-driveable rear wheel steering which is actuated by a control means as a function of a vehicle parameter through comparison of set values and actual values of the rear-wheel steering angle, comprising:

the front wheel steering is positively coupled to a first double-acting piston-cylinder unit positively coupled to the front wheel steering and having two swept chambers of different effective piston area and a piston which, in a central straight-ahead position of the front wheel steering, connects the two swept chambers of the piston-cylinder unit;

a self-locking-free motor drive provided in the rear wheel steering and prestressed by a spring arrangement into a straight-ahead position of the rear wheel steering;

said self-locking-free motor drive being positively coupled to a second double-acting piston-cylinder unit;

the second double-acting piston-cylinder unit having two swept chambers which have an equal effective piston area ratio with the swept chambers of the first double-acting piston-cylinder unit;

said two piston-cylinder units fluidly coupled to one another via two connecting hydraulic lines with one line connecting the larger swept chambers of the two piston-cylinder units and the other line connecting the smaller swept chambers;

a third double-acting piston-cylinder unit having two swept chambers which have an equal effective piston area ratio with the swept chambers of the first and second piston-cylinder units, the larger swept chamber of the third piston-cylinder unit being connectable via a shut-off valve to the line connecting the larger swept chambers of the two other piston-cylinder units and the smaller swept chamber of the third piston cylinder unit being connectable via a further shut-off valve to the other of the two lines connecting the smaller chambers of the two other piston-cylinder units;

wherein, when the two shut-off valves are closed, front wheel steering and rear wheel steering are hydraulically positively connected by the two lines to produce a deflection in the same direction of front and rear wheels.

2. All-wheel steering according to claim 1, wherein the two shut-off valves are opened or closed simultaneously.

3. All-wheel steering according to claim 1, wherein the piston of the third piston-cylinder unit is resiliently stressed into a central position.

4. All-wheel steering according to claim 1, wherein the piston of the third piston-cylinder unit is coupled to at least one stroke sensor, which is connected as an input to a control or regulating device.

5. All-wheel steering according to claim 1, wherein the pistons of the two first piston-cylinder units are coupled to at least one stroke sensor which is connected as an input to a control or regulating device.

6. All-wheel steering according to claim 1, wherein the rear wheel steering is obtained via self-locking gear elements coupled to the second piston-cylinder unit; and wherein the motor drive is drivingly connected in self-locking-free fashion to the second piston-cylinder unit.

7. All-wheel steering according to claim 1, wherein the piston of the second piston-cylinder unit drives a worm via a rack; and wherein said worm interacts with a toothed segment of the rear wheel steering.

8. All-wheel steering according to claim 1, wherein the piston of the second piston-cylinder unit is urged by a restoring arrangement into a central position.

9. All-wheel steering for motor vehicles having front wheel steering actuated by a steering handwheel and motor-driveable rear wheel steering which is actuated by a control means as a function of a vehicle parameter through comparison of set values and actual values of the rear-wheel steering angle, comprising:
- a first double-acting piston-cylinder unit positively coupled to the front wheel steering and having two swept chambers of different effective piston area and a piston which, in a central straight-ahead position of the front wheel steering, connects the two swept chambers of the piston-cylinder unit;
- a self-locking-free motor drive provided at the rear wheel steering and prestressed by a spring arrangement into a straight-ahead position of rear wheel steering;
- said self-locking-free motor drive being positively coupled to a second double-acting piston-cylinder unit;
- the second double-acting piston-cylinder unit having swept chambers of equal effective piston area ratio with the swept chambers of the first double-acting piston-cylinder unit;
- said two piston-cylinder units fluidly coupled to one another via two connecting hydraulic lines with one line connecting the one swept chambers of the two piston-cylinder units and the other line connecting the other swept chambers;
- a third piston-cylinder unit having swept chambers of equal effective piston area ratio with the swept chambers of the first and second piston-cylinders units, being arranged with its one swept chamber connectable via a shut-off valve to the line connecting the one swept chamber of the two other piston-cylinder units and the other swept chamber of the third piston-cylinder unit connectable via a further shut-off valve to the other of the two lines connecting the other chambers of the two other piston-cylinder unit;
- wherein, when the two shut-off valves are closed, front wheel steering and rear wheel steering are hydraulically positively connected by the two lines to produce a deflection in the same direction of front and rear wheels.

10. All-wheel steering according to claim 9, wherein the two shut-off valves are opened or closed simultaneously.

11. All-wheel steering according to claim 9, wherein the piston of the third piston-cylinder unit is resiliently stressed into a central position.

12. All-wheel steering according to claim 9, wherein the piston of the third piston-cylinder unit is coupled to at least one sensor which is connected as an input to a control or regulating device.

13. All-wheel steering according to claim 9, wherein the pistons of the two first piston-cylinder units are coupled to at least one sensor which as an input to a control or regulating device.

14. All-wheel steering according to claim 9, wherein the rear wheel steering is obtained via self-locking gear elements coupled to the second piston-cylinder unit; and the motor drive is drivingly connected in self-locking-free fashion to the second piston-cylinder unit.

15. All-wheel steering according to claim 9, wherein the piston of the second piston-cylinder unit drives a worm via a rack; and said worm interacts with a toothed segment of the rear wheel steering.

16. All-wheel steering according to claim 9, wherein the piston of the second piston-cylinder unit is urged by a restoring arrangement into a central position.

* * * * *